US008752881B2

(12) United States Patent
Chenowth

(10) Patent No.: US 8,752,881 B2
(45) Date of Patent: Jun. 17, 2014

(54) SELF-CORRECTING DRIVE FOR RETRACTABLE CARGO CANOPY

(76) Inventor: Rory H. Chenowth, Ramona, CA (US)

(*) Notice: Subject to any disclaimer, the term of this patent is extended or adjusted under 35 U.S.C. 154(b) by 139 days.

(21) Appl. No.: 13/553,261

(22) Filed: Jul. 19, 2012

(65) Prior Publication Data
US 2014/0021737 A1 Jan. 23, 2014

(51) Int. Cl.
*B60J 7/00* (2006.01)
(52) U.S. Cl.
USPC .......................................... 296/98; 296/100.12
(58) Field of Classification Search
USPC ............................................. 296/98, 100.12
See application file for complete search history.

(56) References Cited

U.S. PATENT DOCUMENTS

| 5,186,231 A * | 2/1993 | Lewis ........................... 160/310 |
| 2010/0219656 A1* | 9/2010 | Chenowth et al. ............... 296/98 |

* cited by examiner

*Primary Examiner* — Joseph Pape
(74) *Attorney, Agent, or Firm* — Charmasson, Buchaca & Leach, LLP

(57) ABSTRACT

In the coupling of bi-directional, non-freewheeling-type DC motors to the pulling spool of a canopy deployment strap and to a take-up roller, ratchet gears assure automatic alignment and synchronization of the deployment and retraction mechanisms. The reverse direction rotation of the unwinding motor can be uninhibited through the slipping of its ratchet gear when the winding motor is slow to take up the pulling strap or the tarp being wound thereon. The slipping provides sufficient slack to accommodate changes of spool and roller diameters as more material is successively wound thereon. A friction brake acting against a flange of the spool keeps it from spinning freely when not engaged by the motor.

20 Claims, 3 Drawing Sheets

SELF-CORRECTING DRIVE FOR RETRACTABLE CARGO CANOPY

FIELD OF THE INVENTION

The instant invention relates to contractible canopy deployment mechanisms such as those used for retractable tarp covers commonly used to temporarily cover over the open-topped cargo compartments of vehicles.

BACKGROUND

Vehicle cargo compartments for transporting bulk materials such as dirt, sand, grass clippings and the like are often covered with a canopy, also called a tarpaulin or tarp, during travel in order to avoid the blowing out part of the load and thus creating a hazardous condition on the highway or contaminating the surroundings, or to prevent the load from getting wet. The tarp needs to be held in place tightly to avoid being dislodged by the wind. Then the compartment needs to be uncovered to unload and load the bulk materials. The repeated covering and uncovering of the compartment can be time-consuming.

Over the years, many automated covering systems have been developed such as the one disclosed in Odegaard, U.S. Pat. No. 4,834,445 incorporated herein by reference, which uses a hydraulic motor to drive the deployment of the sheltering canopy off of a winding roller and over the cargo compartment, and to drive the retraction of the canopy back onto the roller. One advantage of hydraulic motors is that they are easily controlled in the forward and reverse direction by adjusting the pressure of the fluid present. Hydraulic systems however may not be favored in some situations where leaking hydraulic fluid can contaminate other systems or cargo. In addition, hydraulic motors can have complex controls. Systems such as that disclosed in UK Patent GB 2410 926 B Rogerson, can be costly to manufacture, install, and maintain.

Some canopy systems use air driven motors. However such systems can be difficult to install and maintain due to lack of familiarity by operators. Further, some canopy systems are designed to tap into the existing vehicle air system operating the vehicle air brakes. Problems with the canopy air system can therefore lead to more serious problems involving the vehicle brakes.

Some systems use electric motors driven by the vehicle electrical system. Often to reduce the cost of the system, the type of electric motor selected can fall within a fairly narrow range of performance characteristics. This can be problematic in the cargo canopy field which is subject to changing conditions, harsh environments and rugged treatment. For example the canopy mechanism can be impeded by obstacles protruding from the cargo or the accumulation of rust or debris throughout its various components. Further, electrical systems operating in a hot, desert environment may tend to overheat more quickly then one operating in a cooler environment. Although more rugged electric motors are available, they tend to be more costly. Thus, mechanical systems which work in a seemingly similar field such as retractable awnings may not provide any useful guidance for designs in the cargo canopy field.

In some systems there is a dedicated motor to drive deployment actions and an additional separate motor to drive retraction actions.

Some canopy retracting mechanisms previously available are prone to erratic operation due to misalignment of canopy edges, uneven stretching of the canopy fabric, lack of synchronization between driving motors or the jamming of pulling and guiding components. In addition, as material is wound upon a roller or spool its effective diameter changes due to the material already wound on the spool. Thus, it can be difficult to predict the amount of material taken up for any given rotation. This can lead to uneven synchronization of motors, uneven tensioning on the material which in turn can lead to misalignment or other erratic operation. Therefore, in some canopy systems the deploying and retracting motors need to be well balanced and relatively precise in order to assure a smooth operation of the mechanism under the rugged, all-weather conditions typical for cargo vehicles. For stability and exactness of alignment, prior mechanisms have been proposed which require complex boom and lever structures as disclosed in PCT International Publication WO 2005/005186 Hines.

The instant invention results from efforts to address one or more of the above problems with prior cargo canopy systems.

SUMMARY

The primary and secondary objects of the invention are to provide an improved cargo container cover deployment and retraction system. These and other objects are achieved by coupling the pulling, deployment spool of a canopy system to its drive motor using a ratcheting mechanism.

In some embodiments there is provided a system which assures precise and trouble-free operation of canopy deployment and retraction mechanism for a cargo compartment using relatively inexpensive, yet highly reliable, low-voltage, DC motors which can be more easily installed and maintained.

In some embodiments a pair of bi-directional, non-freewheeling DC motors are coupled respectively to the pulling spool of a canopy deploying cable or strap and to the tarp take-up roller using ratchet gears.

In some embodiments the result is automatic alignment and synchronization of the deployment and retraction mechanism.

In some embodiments the rachet gears are single-indentation ratchet gears.

In some embodiments the ratchet gears provide sufficient slack to accommodate changes of spool and roller diameters as the pulling strap or the tarp is wound-up thereupon.

In some embodiments a frictional brake is continuously apply to the spool to avoid uncontrolled spinning In some embodiments there is provided a mechanism for deploying and retracting a flexible sheet canopy over a cargo area wherein a canopy-deploying first motor is used to drive a spool winding up a strap secured to the leading edge of the canopy, and a canopy-retracting second motor is used to drive a take-up roller, including an improvement for avoiding erratic movement of the canopy, said improvement comprising a first ratcheting gear coupling the first motor to the spool.

In some embodiments the improvement further comprises a second ratcheting gear coupling the second motor to the roller.

In some embodiments the improvement further comprises a brake acting upon the spool.

In some embodiments the brake comprises at least one spring-biased member frictionally and continuously applied to the spool.

In some embodiments the spool comprises a lateral flange, and said member is applied to the flange.

In some embodiments the first motor is run in reverse rotation during retraction of the canopy.

In some embodiments the first ratchet gear intermittently disengages the spool from the first motor during reverse rotation as the canopy is being retracted.

In some embodiments the second motor is run in reverse rotation during deployment of the canopy.

In some embodiments the second ratchet gear intermittently disengages the second motor during reverse rotation as the canopy is being deployed.

In some embodiments the first ratchet gear comprises: a first wheel having at least one indentation; and, a spring-biased first pawl engaging said indentation in a forward movement of said first ratchet gear and sliding over said indentation in a reverse movement of said first ratchet gear.

In some embodiments the second ratchet gear comprises: a second wheel having at least one indentation; and, a spring-biased second pawl engaging said indentation in a forward movement of said second ratchet gear and sliding over said indentation in a reverse movement of said second ratchet gear.

In some embodiments the first ratchet gear comprises a wheel having a single indentation engageable by a pawl in the absence of any other indentation, allowing potentially free forward canopy-deploying rotation of the first motor over approximately 360 degrees.

In some embodiments the second ratchet gear comprises a wheel having a single indentation engageable by a pawl in the absence of any other indentation, allowing potentially free forward canopy-retracting rotation of the second motor over approximately 360 degrees.

In some embodiments the roller is connected to a median portion of the canopy and is rotated to take up and wind together both straddling sections of the canopy; and said mechanism further comprises: a track spanning one end of the cargo area, said track supporting the second motor; and a motor-stabilizing torque arm riding on said track.

In some embodiments the improvement further comprises: said strap being a first strap which comprises: a first distal portion connected to said leading edge; and a first proximal portion wound-up on said spool; and, a second strap which comprises: a second distal portion connected to said leading edge; and a second proximal portion wound-up on said spool.

In some embodiments each of said first and second straps are wound upon separate cooperating reels of said spool.

In some embodiments each of said motors is a non-freewheeling-type motor.

In some embodiments the motors are electric, non-freewheeling motors.

In some embodiments the motors are air-driven motors.

In some embodiments there is provided a canopy deployment and retraction mechanism for cargo vehicles comprises: a flexible sheet canopy deployably and retractably wound upon a roller spanning an open topped cargo compartment; a spool winding up a strap secured to the leading edge of the canopy; a first non-free-wheeling motor; and, a first ratcheting gear coupling the first motor to the spool.

The content of the original claims is incorporated herein by reference as summarizing features in one or more exemplary embodiments.

DESCRIPTION OF THE EXEMPLARY EMBODIMENTS

Figure 1:
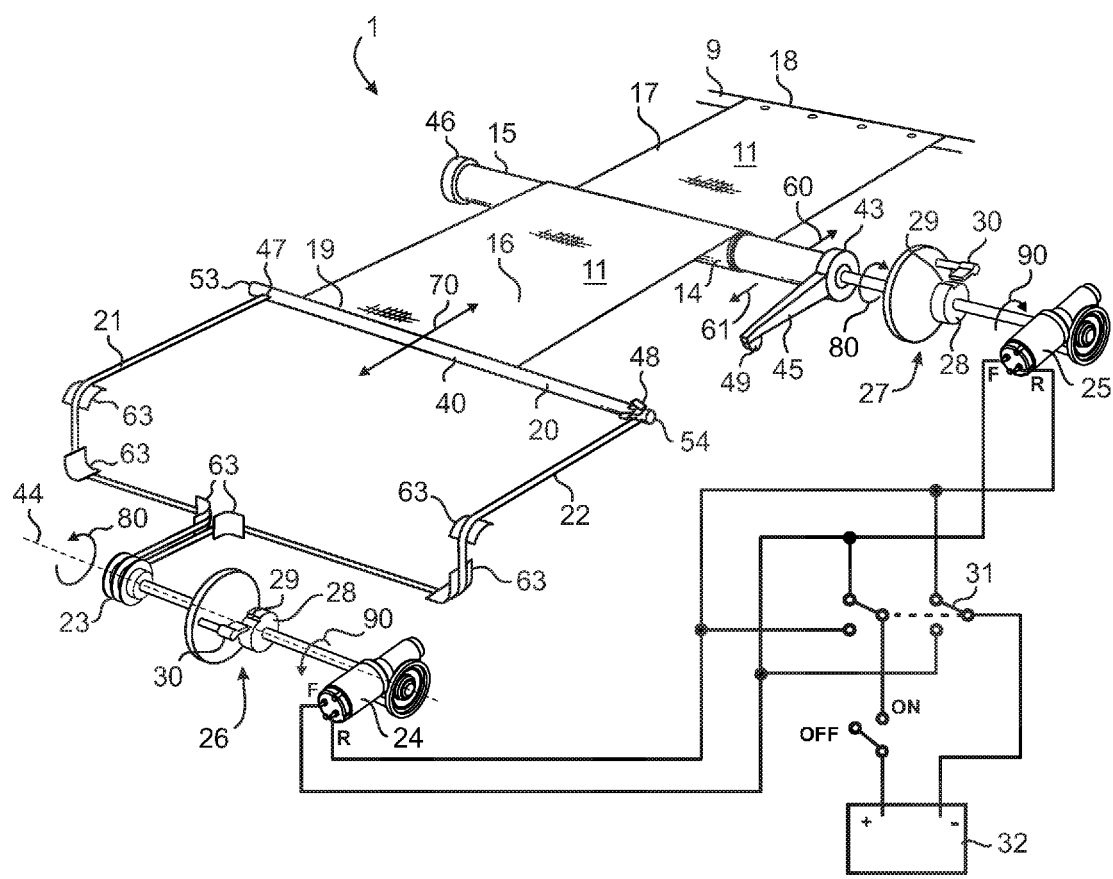
FIG. 1 is a diagrammatical illustration of the canopy mechanism according to an exemplary embodiment of the invention.
Figure 2:
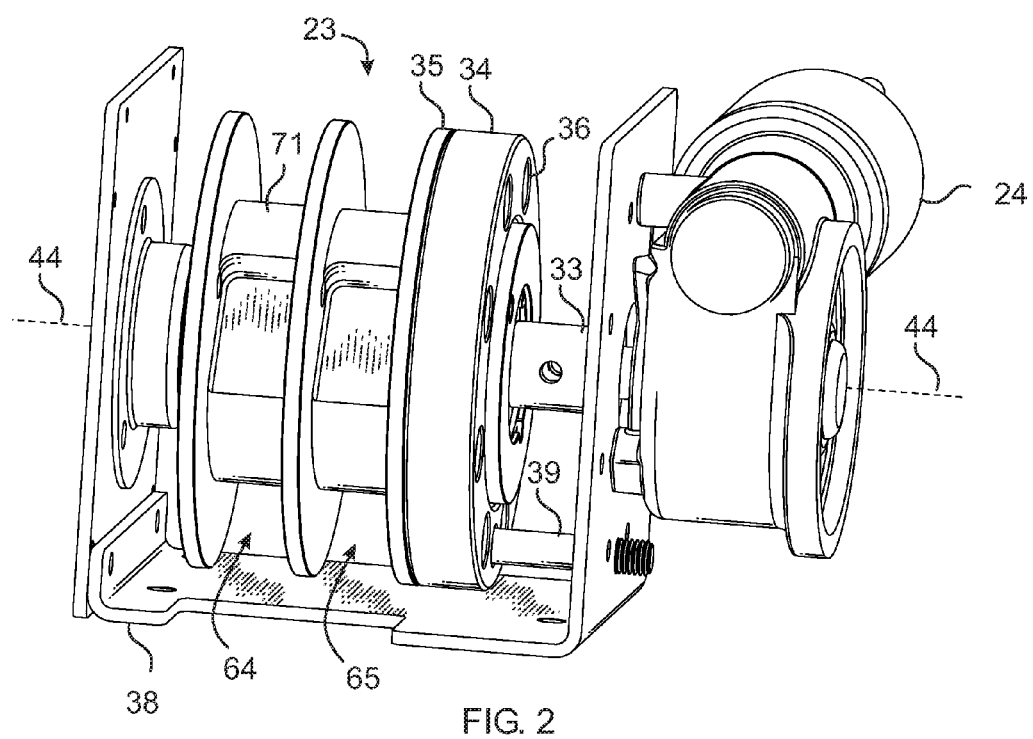
FIG. 2 is a perspective view of the spool assembly.

Referring now to the drawing, there is illustrated in FIGS. 1-5 the basic operation of the canopy deployment and retraction mechanism 1 according to an exemplary embodiment of the invention.

The canopy 11 includes a fabric tarp made of a durable, flexible sheet material which is deployable over the cargo area 12 of a truck, trailer, or wagon. The median section 14 of the canopy is attached to a spindle in the form of a translatable roller 15, whereby when the roller is rotated in a clockwise direction 80 both half-sections 16, 17 of the canopy astride the median section are taken-up and wound-up together as the roller translates 60 toward the stationary end 18 of the canopy secured to one side rim 9 of the cargo area, and translates 61 toward the opposite rim 55 when the canopy is unwound.

The opposite and free leading edge 19 of the canopy 11 is secured to a pull-rod 20 which courses 70 over the open top of the compartment and the opposite side rim 55 of the cargo area. The opposite extremities 53,54 of the pull-rod are supported on the opposite front and back rims 51,52 of the cargo area which are formed to have mutually parallel and convex rounded upper surfaces that form arcuate tracks for the extremities of the pull-rod and the ends of the roller.

The opposite extremities 53,54 of the pull-rod are connected to a pair of straps 21, 22 which course along the front and back rims 51,52 of the cargo area and over a number of direction altering, gradually curving guides 63. The free ends of the straps are wound-up on a spindle in the form of a dual-reeled spool 23 so that each strap is wound upon a separate, cooperating, coaxial reels 64,65 within the spool to avoid fouling and to provide greater control of how much of each strap is taken up in its dedicated reel during a given revolution of the spool. The straps can connect to the pull rod through a substantially permanent connection 47, or an adjustable connection 48. An adjustable connection is preferred when the connection between the straps and spool is less accessible or adjustable.

Thus the material being wound on the spool is strap material, while the material being wound upon the roller is tarp material.

The spool 23 is driven by a first non-freewheeling DC motor 24 of typically 12 or 24 volts and a standard operating range of between about 20 to 60 amperes but which can briefly go as high as 180 amperes. To be non-freewheeling the motor includes a worm gear transmission which prevents movement of the motor drive shaft due to load-derived torque. In other words, in a non-free-wheeling motor there is substantially no motor shaft movement unless the motor is energized in the forward or reverse direction. A similar, second DC motor 25 similarly drives the canopy-retracting roller 15. The use of non-freewheeling motors allows the deployed canopy to be firmly held in place while both motors remain de-energized. Such non-freewheeling DC electric motors are relatively inexpensive and are commercially available from Superwinch, LLC of Dayville, Conn.

The first motor 24 can be coupled to the canopy deployment spool 23, rotatably carried within a protective housing 38, by means of a first ratchet gear 26. The second motor 25 can be coupled to the roller 15 by means of a second ratchet gear 27. Each ratchet gear can have a wheel 28 associated with the motor including a single peripheral indentation 29 that is engaged by a spring-biased pawl 30 associated with the spool or roller when the motor runs in its forward, either deploying or retracting direction as indicated on each motor by an arrow 90. When a motor runs in reverse direction, the pawl stays engaged so long as its spindle is being pulled to let out material. When the reverse direction motor turns faster than the material of its associate spindle is being pulled out, the pawl disengages its indentation and rides over its wheel. In other words, in the unwinding direction, either motor can turn faster than its associated spindle turns. Thus the ratchet gear intermittently disengages the unwinding motor from its unwinding spindle.

The single indentation provides an easily manufactured, rugged, heavy-duty ratchet particularly useful in the rugged environment of cargo trucks. It also allows an amount of free play of the gear of potentially up to approximately 360 degrees before the pawl engages. Accordingly, the spool 23 or the roller 15 can be subject to delayed engagement of the motor while it powers up to speed. This helps to lower the peak current drawn on the motor when it starts up under load.

The motors are preferably run in opposite directions from each other so that the unwinding motor essentially determines how much material is being transferred. When the unwinding motor turns more quickly than the amount of material is being wound by the winding motor, the unwinding motor begins to ratchet. This can continue until the winding motor takes up enough material to "catch-up". On the other hand, when the winding motor attempts to take up more material than the unwinding motor is giving out, the unwinding motor prevents the winding motor from turning as quickly as it wants helping to keep the material taut and aligned. A double pole, double throw switch 31 reverses the polarity of the current drawn from a battery 32 and applied to the motors; thus simultaneously reversing the respective directions of the motors.

As illustrated in FIGS. 1-4, the spool 23 is rotatably mounted on an axle 33 coupled to the first motor 24 through a first ratchet gear 26 formed into the hub 71 of the spool. Thus the spool and axle can rotate about a common axis 44. A constantly engaged circular friction enhancing element or brake 34 axially surrounds the axle in a concentric arrangement and in close proximity to axially contact a lateral flange 35 of the spool.

Figure 3:
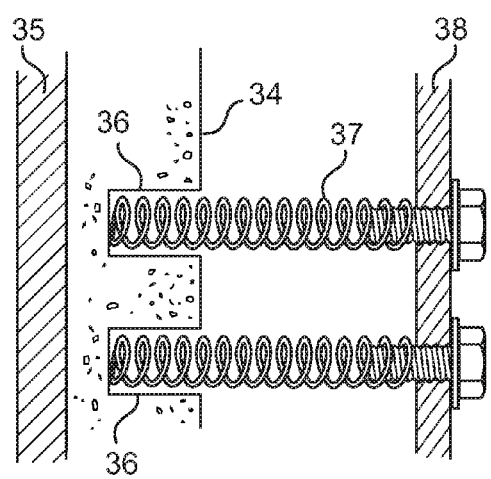
FIG. 3 is a diagrammatical, partial cross-sectional view of the spool brake.

Referring primarily to FIG. 3, each of a plurality of cavities 36 in the cylindrical brake holds a plurality of springs 37 bearing against the spool frame housing 38 for biasing the brake against the outer surface of the flange 35. The frictional contact between the brake and the flange provides a braking action on the spool which causes the ratchet to disengage and allow the first motor to spin in the reverse, unwinding direction without causing the spool to give out more strap than is being taken up through the winding of the tarp. In other words, the amount of strap unwound off the spool is controlled by the amount of tarp being wound by the roller under power of the second motor. In this way there is no over-unwinding of the spool even though the first motor spins freely in the unwinding direction. The brake is angularly fixed with respect to the frame 38 of the spool assembly by a bolt 39 but is allows to translate axially. Due to the larger inertia of the roller, a brake is typically unnecessary on the roller.

Figure 4:
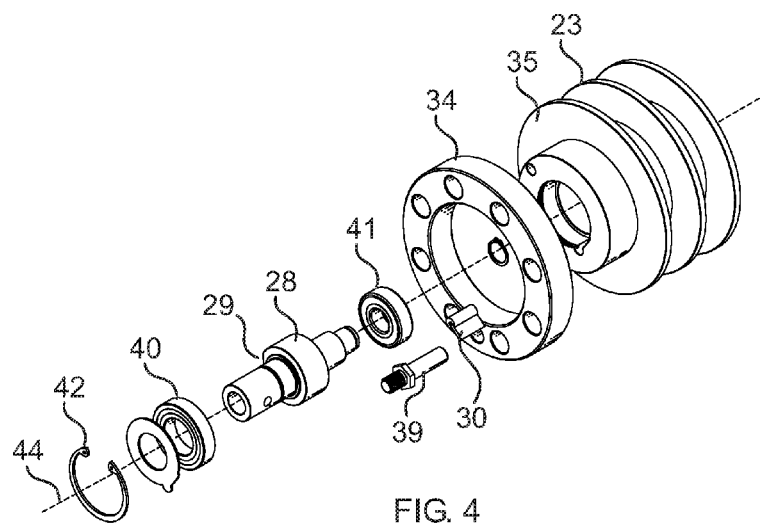
FIG. 4 is an exploded view of the spool assembly.

The exploded view of the spool assembly in FIG. 4 illustrates is various components previously described and its bearings 40, 41 and lock washer 42.

Figure 5:
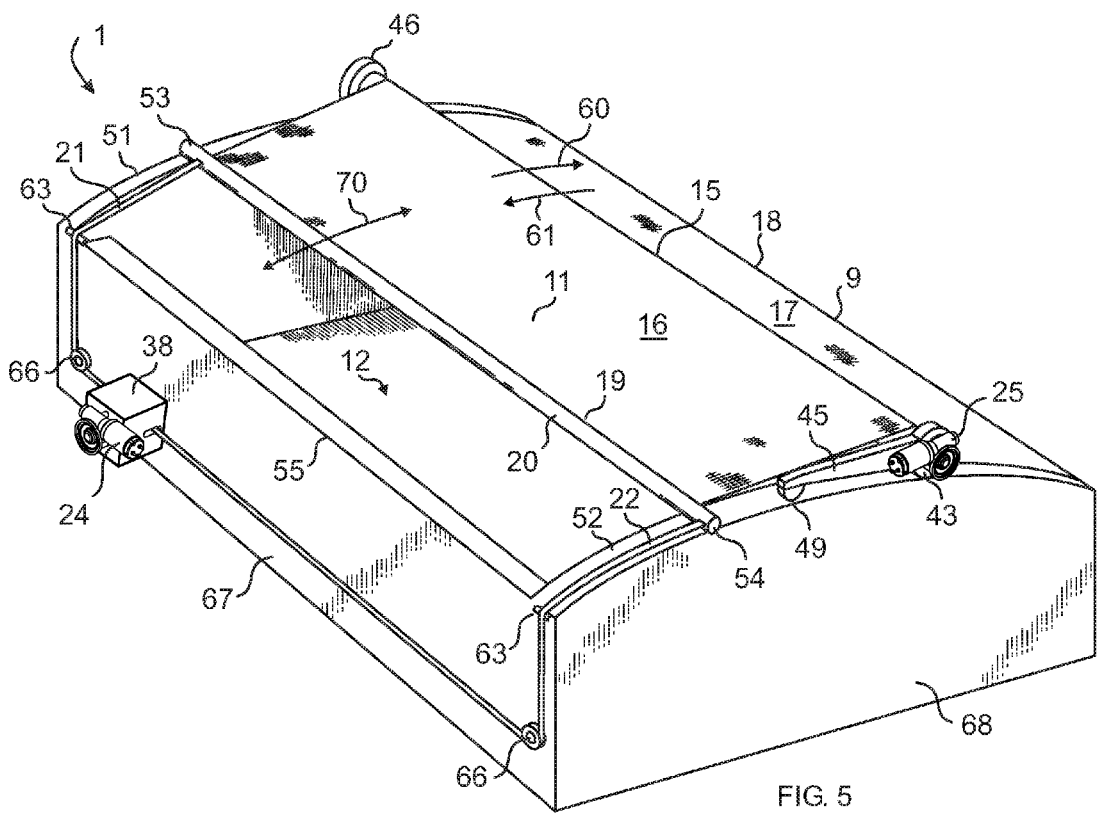
FIG. 5 is a diagrammatic perspective view of the canopy deployment and retraction mechanism.

Referring primarily to FIG. 5, the second motor 25 can be mounted on a sled 43 that rides on an arcuate first track formed by the front and back rims 51,52 spanning the cargo area 12. The curved track can help create a better seal against water when the canopy is deployed. A stabilizing arm 45 has a distal pad 49 which slidingly bears on the track and provides a torquing anchor for the motor. The pad's contact surface can be made from rigid plastic or other durable low-friction material. The opposite end 46 of the roller can terminate in a wheel which can roll across a similar second track 51 parallel to the first along the opposite rim of the cargo area. Alternately, a second similar stabilizing arm can be provided on the opposite end.

Although the opposite front and back rims 51,52 of the cargo area are often formed to have mutually parallel and convex rounded upper surfaces to help ensure a weatherproof seal when the tarp is fully deployed, the above system can be readily adapted to cargo areas having flat upper surfaces.

The straps can contact and slide against the track formed on the front and back rims as shown on the strap 22 running along the back rim 52, or alternately the straps can run off the track inside the rim as shown on the strap 21 running along the front rim 51. Alternately, direction altering pulleys 66 can be used instead of one or more of the guides and result in somewhat less wear on the straps. However, guides have proven less prone to fouling and do not appreciably increase the wear on the inexpensively replaced straps. It should be noted that although the first motor and spool housing is shown located on the outer surface 67 of the cargo container side wall, it can be conveniently mounted to the container end wall 68 or even under the container and the straps routed accordingly in order to better protect the motor and housing.

In this way the mechanism can operate in absence of expensive and efficiency-robbing stabilizing gears or levers to guide the movement of the canopy. Further, the gearing of the motors can be selected so that the spool motor winds more rapidly such as through using a 60:1 gear ratio than the roller motor using a 90:1 gear ratio. Alternately, by increasing the spool diameter, both motors can be substantially identical, meaning both motors can be of a single manufacturing model and can be swapable such that either motor can be used as the deployment motor or the retraction motor.

Although the system has been shown to make use of relatively inexpensive, non-freewheeling, DC electric motors, other types of motors can be used and take advantage of the automatic alignment capability of the direction reverseable ratcheted motors. For example, air and hydraulic motors can be used without as much concern for motor synchronization.

While the preferred embodiment of the invention has been described, modifications can be made and other embodiments may be devised without departing from the spirit of the invention and the scope of the appended claims.

What is claimed is:

1. In a mechanism for deploying and retracting a flexible sheet canopy over a cargo area wherein a canopy-deploying first motor is used to drive a spool winding up a strap secured to the leading edge of the canopy, and a canopy-retracting second motor is used to drive a take-up roller, an improvement for avoiding erratic movement of the canopy, said improvement comprising:
a first ratcheting gear coupling the first motor to the spool.

2. The improvement of claim 1, which further comprises a second ratcheting gear coupling the second motor to the roller.

3. The improvement of claim 1, which further comprises a brake acting upon the spool.

4. The improvement of claim 3, wherein the brake comprises at least one spring-biased member frictionally and continuously applied to the spool.

5. The improvement of claim 4, wherein the spool comprises a lateral flange, and said member is applied to the flange.

6. The improvement of claim 1, wherein the first motor is run in reverse rotation during retraction of the canopy.

7. The improvement of claim 6, wherein the first ratchet gear intermittently disengages the spool from the first motor during reverse rotation as the canopy is being retracted.

8. The improvement of claim 7, wherein the second motor is run in reverse rotation during deployment of the canopy.

9. The improvement of claim 8, wherein the second ratchet gear intermittently disengages the second motor during reverse rotation as the canopy is being deployed.

10. The improvement of claim 1, wherein said first ratchet gear comprises:
　　a first wheel having at least one indentation; and,
　　a spring-biased first pawl engaging said indentation in a forward movement of said first ratchet gear and sliding over said indentation in a reverse movement of said first ratchet gear.

11. The improvement of claim 10, wherein said second ratchet gear comprises:
　　a second wheel having at least one indentation; and,
　　a spring-biased second pawl engaging said indentation in a forward movement of said second ratchet gear and sliding over said indentation in a reverse movement of said second ratchet gear.

12. The improvement of claim 7, wherein the first ratchet gear comprises a wheel having a single indentation engageable by a pawl in the absence of any other indentation, allowing potentially free forward canopy-deploying rotation of the first motor over approximately 360 degrees.

13. The improvement of claim 9, wherein said second ratchet gear comprises a wheel having a single indentation engageable by a pawl in the absence of any other indentation, allowing potentially free forward canopy-retracting rotation of the second motor over approximately 360 degrees.

14. The improvement of claim 2, wherein the roller is connected to a median portion of the canopy and is rotated to take up and wind together both straddling sections of the canopy; and said mechanism further comprises:
　　a track spanning one end of the cargo area, said track supporting the second motor; and
　　a motor-stabilizing torque arm riding on said track.

15. The improvement of claim 1, wherein said improvement further comprises:
　　said strap being a first strap which comprises:
　　　　a first distal portion connected to said leading edge; and
　　　　a first proximal portion wound-up on said spool; and,
　　a second strap which comprises:
　　　　a second distal portion connected to said leading edge; and
　　　　a second proximal portion wound-up on said spool.

16. The improvement of claim 15, wherein each of said first and second straps are wound upon separate cooperating reels of said spool.

17. The improvement of claim 15, wherein each of said motors is a non-freewheeling-type motor.

18. The improvement of claim 1, wherein said motors are electric, non-freewheeling motors.

19. The improvement of claim 1, wherein said motors are air-driven motors.

20. A canopy deployment and retraction drive mechanism for cargo vehicles comprises:
　　a flexible sheet canopy deployably and retractably wound upon a roller spanning an open topped cargo compartment;
　　a spool winding up a strap secured to the leading edge of the canopy;
　　a first non-free-wheeling motor; and,
　　a first ratcheting gear coupling the first motor to the spool.

* * * * *